United States Patent
May et al.

(10) Patent No.: US 7,197,412 B2
(45) Date of Patent: Mar. 27, 2007

(54) METHOD AND INTEGRATED CIRCUIT FOR USE BY A HANDHELD MULTIPLE FUNCTION DEVICE

(75) Inventors: Marcus W. May, Austin, TX (US); Daniel P Mulligan, Austin, TX (US); Matthew Brady Henson, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 11/407,821

(22) Filed: Apr. 20, 2006

(65) Prior Publication Data
US 2006/0190199 A1 Aug. 24, 2006

Related U.S. Application Data

(63) Continuation of application No. 10/603,640, filed on Jun. 25, 2003.

(60) Provisional application No. 60/429,941, filed on Nov. 29, 2002.

(51) Int. Cl.
*G01R 31/36* (2006.01)

(52) U.S. Cl. .................... 702/63; 702/64; 702/182

(58) Field of Classification Search ............ 702/63, 702/64, 119, 123, 182, 183
See application file for complete search history.

(56) References Cited

U.S. PATENT DOCUMENTS

| | | | |
|---|---|---|---|
| 5,602,963 A * | 2/1997 | Bissonnette et al. | 704/275 |
| 6,310,556 B1 * | 10/2001 | Green et al. | 340/636.15 |
| 6,493,758 B1 * | 12/2002 | McLain | 709/227 |
| 6,505,055 B1 * | 1/2003 | Kahn et al. | 455/564 |
| 6,763,470 B1 * | 7/2004 | Bell et al. | 713/320 |
| 7,039,742 B1 * | 5/2006 | Lada et al. | 710/301 |
| 7,058,484 B1 * | 6/2006 | Potega | 700/297 |

* cited by examiner

*Primary Examiner*—Marc S. Hoff
*Assistant Examiner*—Anthony Gutierrez
(74) *Attorney, Agent, or Firm*—Garlick Harrison & Markison; Bruce E. Stuckman

(57) ABSTRACT

A method for use in a multifunction handheld device includes receiving a first plurality of digitally formatted files from a host device when coupled to the host device via a host interface. A selected one of the first plurality of digitally formatted files is played, the playing includes generating an audio output. The method monitors for a low voltage condition produced by a low battery voltage. When the low voltage condition is detected, a first fail safe algorithm is enabled to disable the audio output, store an audio setting corresponding to the playing of the audio output, and to shutdown the multifunction handheld device.

31 Claims, 7 Drawing Sheets multi-function handheld device 40 integrated circuit 12-2 integrated circuit 12-3

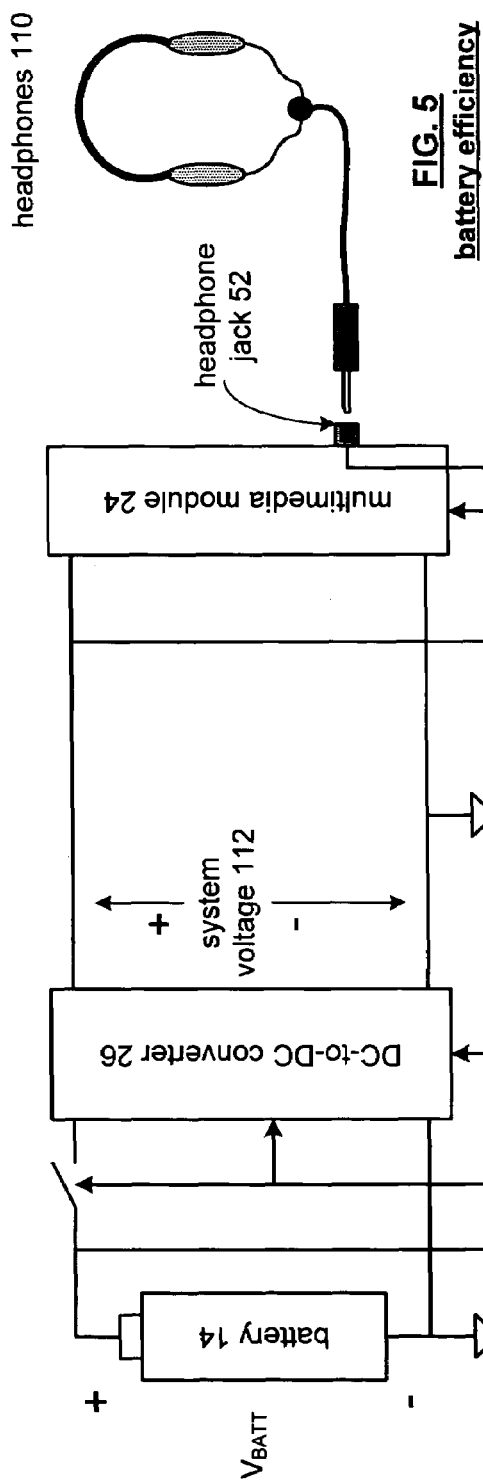
FIG. 5
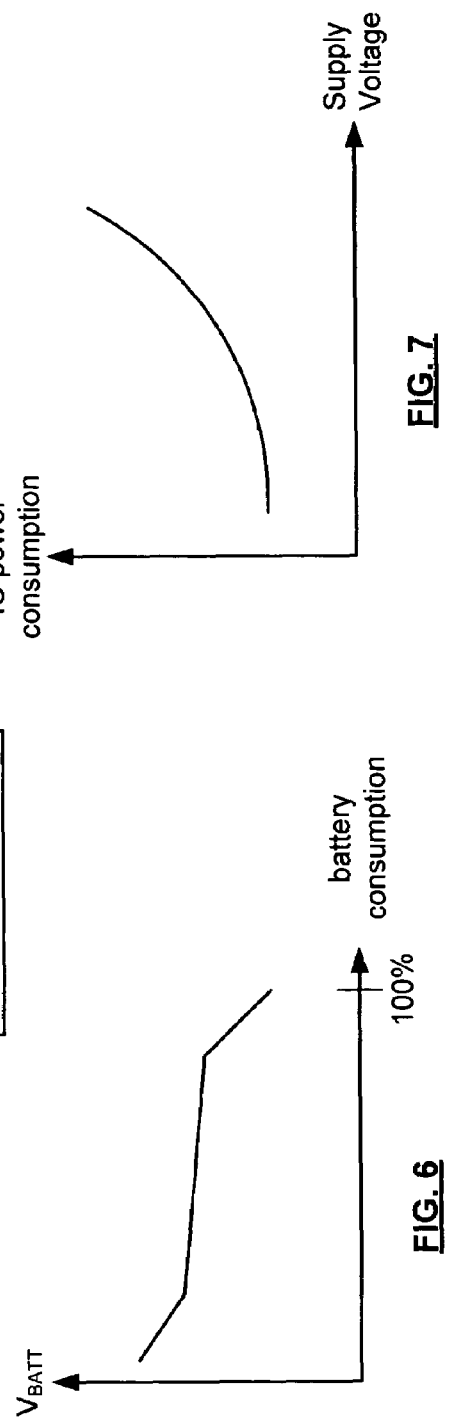
FIG. 7
FIG. 6

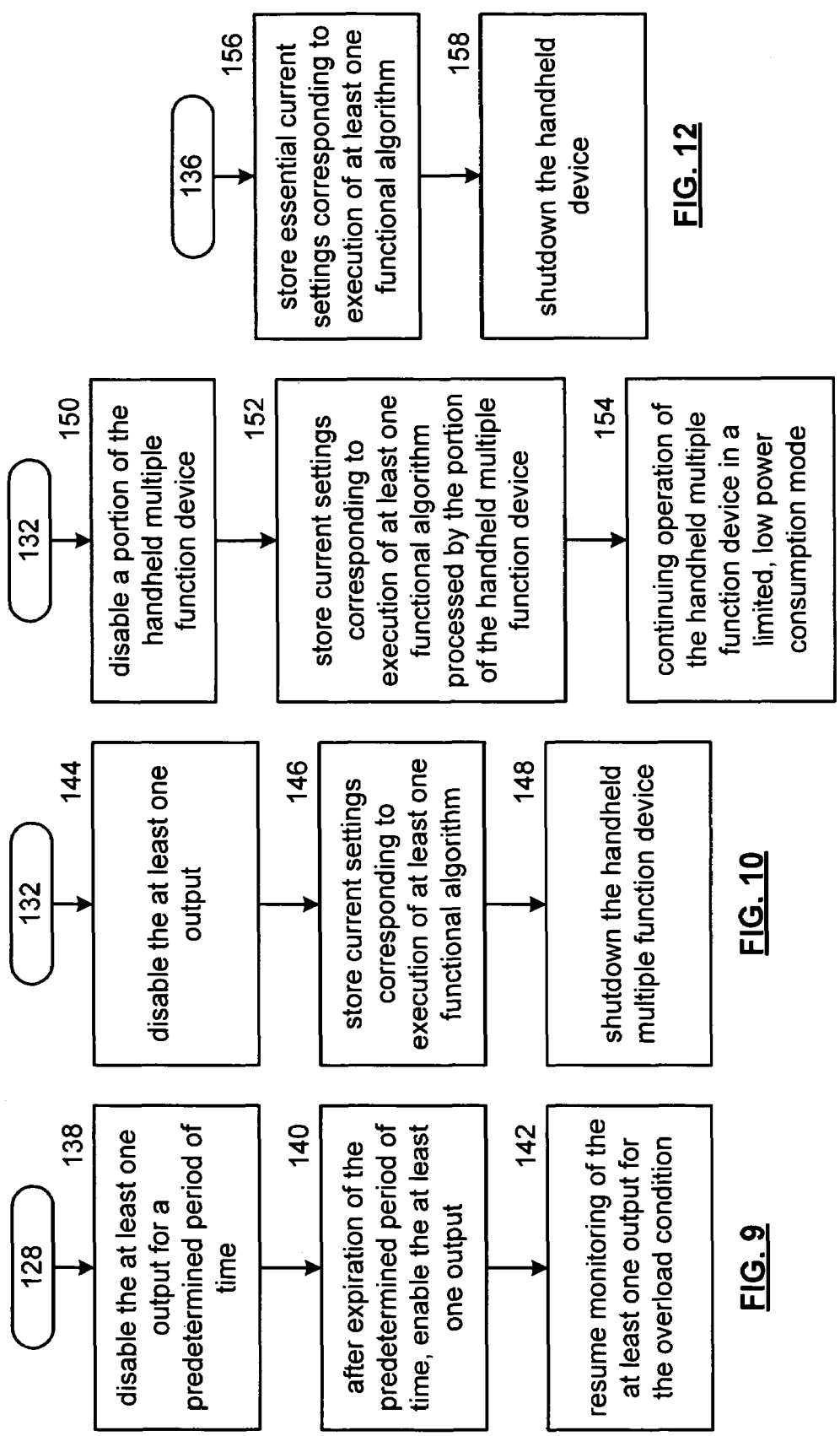

US 7,197,412 B2

METHOD AND INTEGRATED CIRCUIT FOR USE BY A HANDHELD MULTIPLE FUNCTION DEVICE

CROSS REFERENCE TO RELATED PATENTS

This patent is claiming priority under 35 USC § 119(e) to provisionally filed patent application entitled MULTI-FUNCTION HANDHELD DEVICE, having a provisional Ser. No. of 60/429,941 and a provisional filing date of Nov. 29, 2002.

This patent is a continuation of copending U.S. patent application Ser. No. 10/603,640, entitled METHOD AND APPARATUS FOR EFFICIENT BATTERY USE BY A HANDHELD MULTIPLE FUNCTION DEVICE, filed on Jun. 25, 2003.

BACKGROUND OF THE INVENTION

1. Technical Field of the Invention

This invention relates generally to portable electronic equipment and more particularly to efficient powering of such devices.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices include one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

A vital concern with every battery powered handheld device is its battery life (i.e., how long the handheld device will run before the battery has to be replaced). There are two primary components to extending the battery life of a handheld device: one is to minimize power consumption and the other is to use the battery to its fullest capacity. Most of the efforts to date with respect to battery life have been focused on reducing power consumption. While this is extremely important, using the battery to its fullest extent is becoming more critical and getting some attention.

Current techniques to use the battery to its fullest extent safely (i.e., shutting down the handheld device in a safe manner when the battery is consumed) monitor the battery voltage. When the battery voltage drops below a threshold, the handheld device is shutdown by storing current user settings et cetera such that when the battery is replaced, the handheld device comes up in a known manner and, if desired, where it left off just before the battery was replaced. If the handheld device is not shutdown in a known manner when the battery voltage drops below the threshold, the software of the handheld device may lock-up causing the handheld device to require service.

While monitoring the battery voltage does provide a safe shutdown mechanism extending the usefulness of a battery, it does not enable the battery to be used to its fullest extent, nor does it distinguish the possible reasons as to why the battery voltage dropped.

Therefore, a need exists for a method and apparatus that maximizes battery life based on operating conditions of a battery powered handheld device.

BRIEF SUMMARY OF THE INVENTION

The method and apparatus for efficient battery use by a handheld multifunction device of the present invention substantially meets these needs and others. In one embodiment, a method for efficient battery use begins by monitoring at least one output of the handheld device for an overload condition. For example, the headphone jack output may be monitored for an overload condition, which may be caused by an improper installation of a headphone, a short, et cetera. The processing continues by monitoring a system voltage produced by a DC-to-DC converter for a system low voltage condition. For example, based on the power requirements to be sourced by the DC-to-DC converter, the DC-to-DC converter is overloaded such that its output voltage is drooping. The process continues by monitoring voltage of the, battery for a battery low voltage condition. For example, the battery voltage may be monitored for falling below a threshold, which may result from extended use or failing to make adequate electrical contact with the terminals of the handheld device. The processing then continues by enabling one of a plurality of fail-safe algorithms based on when one or more of the overload condition, the system low voltage condition, and/or the battery low voltage condition are detected. With such a method, and/or apparatus incorporating such a method, the battery life of a handheld device may be taken to its fullest extent and just before the battery has insufficient power to power the handheld device, the handheld device is partially or fully shutdown in a safe manner.

BRIEF DESCRIPTION OF THE SEVERAL VIEWS OF THE DRAWINGS

FIG. 5 is a schematic block diagram of the handheld device providing efficient battery use in accordance with the present invention;

FIG. 6 is a graph plotting battery consumption versus battery voltage;

FIG. 7 is a graph plotting supply voltage versus power consumption for CMOS integrated circuits;

FIGS. 9–12 are logic diagrams regarding the plurality of fail-safe algorithms that may be performed in accordance with the method of FIG. 8.

DETAILED DESCRIPTION OF THE INVENTION

Figure 1:
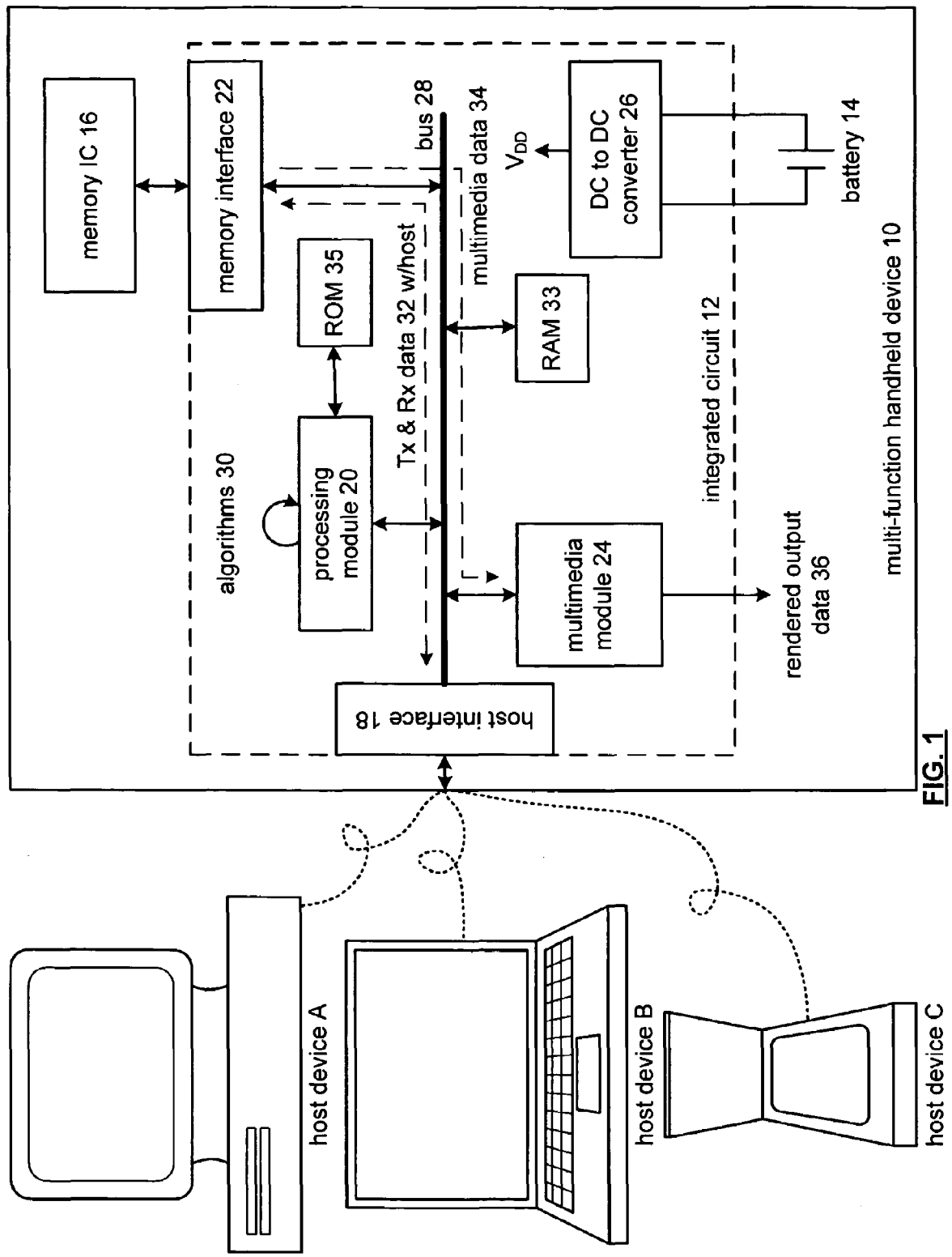
FIG. 1 is a schematic block diagram of a multifunction handheld device in accordance with the present invention.

FIG. 1 is a schematic block diagram of a multi-function handheld device 10 and corresponding integrated circuit 12 operably coupled to a host device A, B, or C. The multi-function handheld device 10 also includes memory integrated circuit (IC) 16 and a battery 14. The integrated circuit 12 includes a host interface 18, a processing module 20, a memory interface 22, a multimedia module 24, a DC-to-DC converter 26, and a bus 28. The multimedia module 24 alone or in combination with the processing module 20 provides the functional circuitry for the integrated circuit 12. The DC-to-DC converter 26, which may be constructed in accordance with the teaching of U.S. Pat No. 6,204,651, entitled METHOD AND APPARATUS FOR REGULATING A DC VOLTAGE, provides at least a first supply voltage to one or more of the host interface 18, the processing module 20, the multimedia module 24, and the memory interface 22. The DC-to-DC converter 26 may also provide VDD to one or more of the other components of the handheld device 10.

When the multi-function handheld device 10 is operably coupled to a host device A, B, or C, which may be a personal computer, workstation, server (which are represented by host device A), a laptop computer (host device B), a personal digital assistant (host device C), and/or any other device that may transceive data with the multi-function handheld device, the processing module 20 performs at least one algorithm 30, where the corresponding operational instructions of the algorithm 30 are stored in memory 16 and/or in memory incorporated in the processing module 20. The processing module 20 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 20 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 10 in the first functional mode, the integrated circuit 12 facilitates the transfer of data between the host device A, B, or C and memory 16, which may be non-volatile memory (e.g., flash memory, disk memory, SDRAM) and/or volatile memory (e.g., DRAM). In one embodiment, the memory IC 16 is a NAND flash memory that stores both data and the operational instructions of at least some of the algorithms 30.

In this mode, the processing module 30 retrieves a first set of operational instructions (e.g., a file system algorithm, which is known in the art) from the memory 16 to coordinate the transfer of data. For example, data received from the host device A, B, or C (e.g., Rx data) is first received via the host interface module 18. Depending on the type of coupling between the host device and the handheld device 10, the received data will be formatted in a particular manner. For example, if the handheld device 10 is coupled to the host device via a USB cable, the received data will be in accordance with the format proscribed by the USB specification. The host interface module 18 converts the format of the received data (e.g., USB format) into a desired format by removing overhead data that corresponds to the format of the received data and storing the remaining data as data words. The size of the data words generally corresponds directly to, or a multiple of, the bus width of bus 28 and the word line size (i.e., the size of data stored in a line of memory) of memory 16. Under the control of the processing module 20, the data words are provided, via the memory interface 22, to memory 16 for storage. In this mode, the handheld device 10 is functioning as extended memory of the host device (e.g., like a thumb drive).

In furtherance of the first functional mode, the host device may retrieve data (e.g., Tx data) from memory 16 as if the memory were part of the computer. Accordingly, the host device provides a read command to the handheld device, which is received via the host interface 18. The host interface 18 converts the read request into a generic format and provides the request to the processing module 20. The processing module 20 interprets the read request and coordinates the retrieval of the requested data from memory 16 via the memory interface 22. The retrieved data (e.g., Tx data) is provided to the host interface 18, which converts the format of the retrieved data from the generic format of the handheld device into the format of the coupling between the handheld device and the host device. The host interface 18 then provides the formatted data to the host device via the coupling.

The coupling between the host device and the handheld device may be a wireless connection or a wired connection. For instance, a wireless connection may be in accordance with Bluetooth, IEEE 802.11(a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 18 includes a corresponding encoder and decoder. For example, when the handheld device 10 is coupled to the host device via a USB cable, the host interface module 18 includes a USB encoder and a USB decoder.

As one of average skill in the art will appreciate, the data stored in memory 16, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. As one of average skill in the art will further appreciate, when the handheld device 10 is coupled to the host device A, B, or C, the host device may power the handheld device 10 such that the battery is unused.

When the handheld device 10 is not coupled to the host device, the processing module 20 executes an algorithm 30 to detect the disconnection and to place the handheld device in a second operational mode. In the second operational mode, the processing module 20 retrieves, and subsequently executes, a second set of operational instructions from memory 16 to support the second operational mode. For example, the second operational mode may correspond to MP3 file playback, digital dictaphone recording, MPEG file playback, JPEG file playback, text messaging display, cellular telephone functionality, and/or AM/FM radio reception. Each of these functions is known in the art, thus no further discussion of the particular implementation of these functions will be provided except to further illustrate the concepts of the present invention.

In the second operational mode, under the control of the processing module 20 executing the second set of operational instructions, the multimedia module 24 retrieves multimedia data 34 from memory 16. The multimedia data 34 includes at least one of digitized audio data, digital video data, and text data. Upon retrieval of the multimedia data, the multimedia module 24 converts the data 34 into rendered output data 36. For example, the multimedia module 24 may convert digitized data into analog signals that are subsequently rendered audible via a speaker or via a headphone jack. In addition, or in the alternative, the multimedia module 24 may render digital video data and/or digital text data into RGB (red-green-blue), YUV, etc., data for display on an LCD (liquid crystal display) monitor, projection CRT, and/or on a plasma type display. The multimedia module 24 will be described in greater detail with reference to FIGS. 2 and 3.

As one of average skill in the art, the handheld device 10 may be packaged similarly to a thumb drive, a cellular telephone, pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 2:
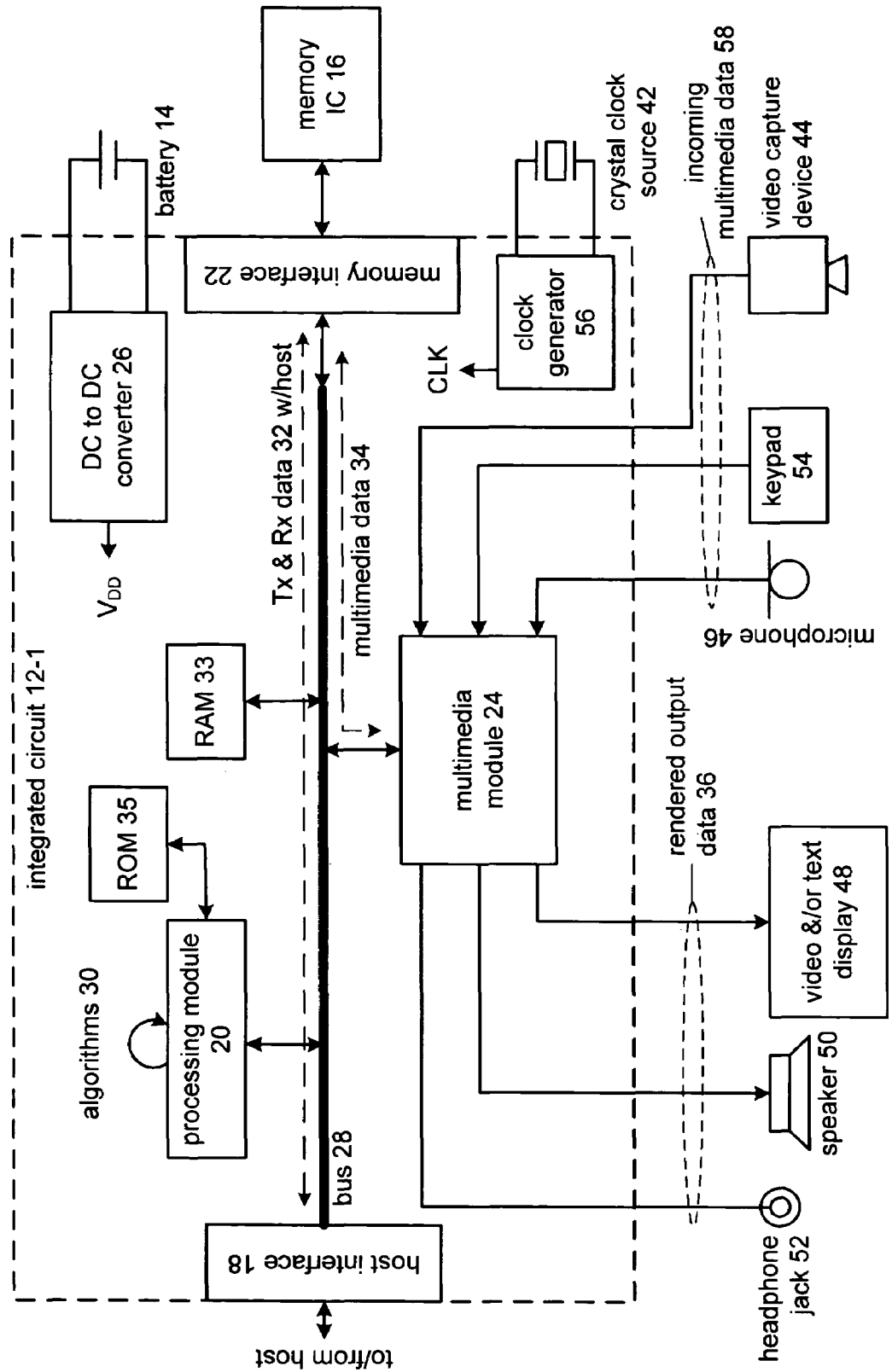
FIG. 2 is a schematic block diagram of another multifunction handheld device in accordance with the present invention.

FIG. 2 is a schematic block diagram of another handheld device 40 and a corresponding integrated circuit 12-1. In this embodiment, the handheld device 40 includes the integrated circuit 12-1, the battery 14, the memory 16, a crystal clock source 42, one or more multimedia input devices (e.g., one or more video capture device(s) 44, keypad(s) 54, microphone(s) 46, etc.), and one or more multimedia output devices (e.g., one or more video and/or text display(s) 48, speaker(s) 50, headphone jack(s) 52, etc.). The integrated circuit 12-1 includes the host interface 18, the processing module 20, the memory interface 22, the multimedia module 24, the DC-to-DC converter 26, and a clock generator 56, which produces a clock signal (CLK) for use by the other modules. As one of average skill in the art will appreciate, the clock signal CLK may include multiple synchronized clock signals at varying rates for the various operations of the multi-function handheld device.

Handheld device 40 functions in a similar manner as handheld device 10 when exchanging data with the host device (i.e., when the handheld device is in the first operational mode). In addition, while in the first operational mode, the handheld device 40 may store digital information received via one of the multimedia input devices 44, 46, and 54. For example, a voice recording received via the microphone 46 may be provided as multimedia input data 58, digitized via the multimedia module 24 and digitally stored in memory 16. Similarly, video recordings may be captured via the video capture device 44 (e.g., a digital camera, a camcorder, VCR output, DVD output, etc.) and processed by the multimedia module 24 for storage as digital video data in memory 16. Further, the key pad 54 (which may be a keyboard, touch screen interface, or other mechanism for inputting text information) provides text data to the multimedia module 24 for storage as digital text data in memory 16. In this extension of the first operational mode, the processing module 20 arbitrates write access to the memory 16 among the various input sources (e.g., the host and the multimedia module).

When the handheld device 40 is in the second operational mode (i.e., not connected to the host), the handheld device may record and/or playback multimedia data stored in the memory 16. Note that the data provided by the host when the handheld device 40 was in the first operational mode includes the multimedia data. The playback of the multimedia data is similar to the playback described with reference to the handheld device 10 of FIG. 1. In this embodiment, depending on the type of multimedia data 34, the rendered output data 36 may be provided to one or more of the multimedia output devices. For example, rendered audio data may be provided to the headphone jack 52 an/or to the speaker 50, while rendered video and/or text data may be provided to the display 48.

The handheld device 40 may also record multimedia data 34 while in the second operational mode. For example, the handheld device 40 may store digital information received via one of the multimedia input devices 44, 46, and 54.

Figure 3:
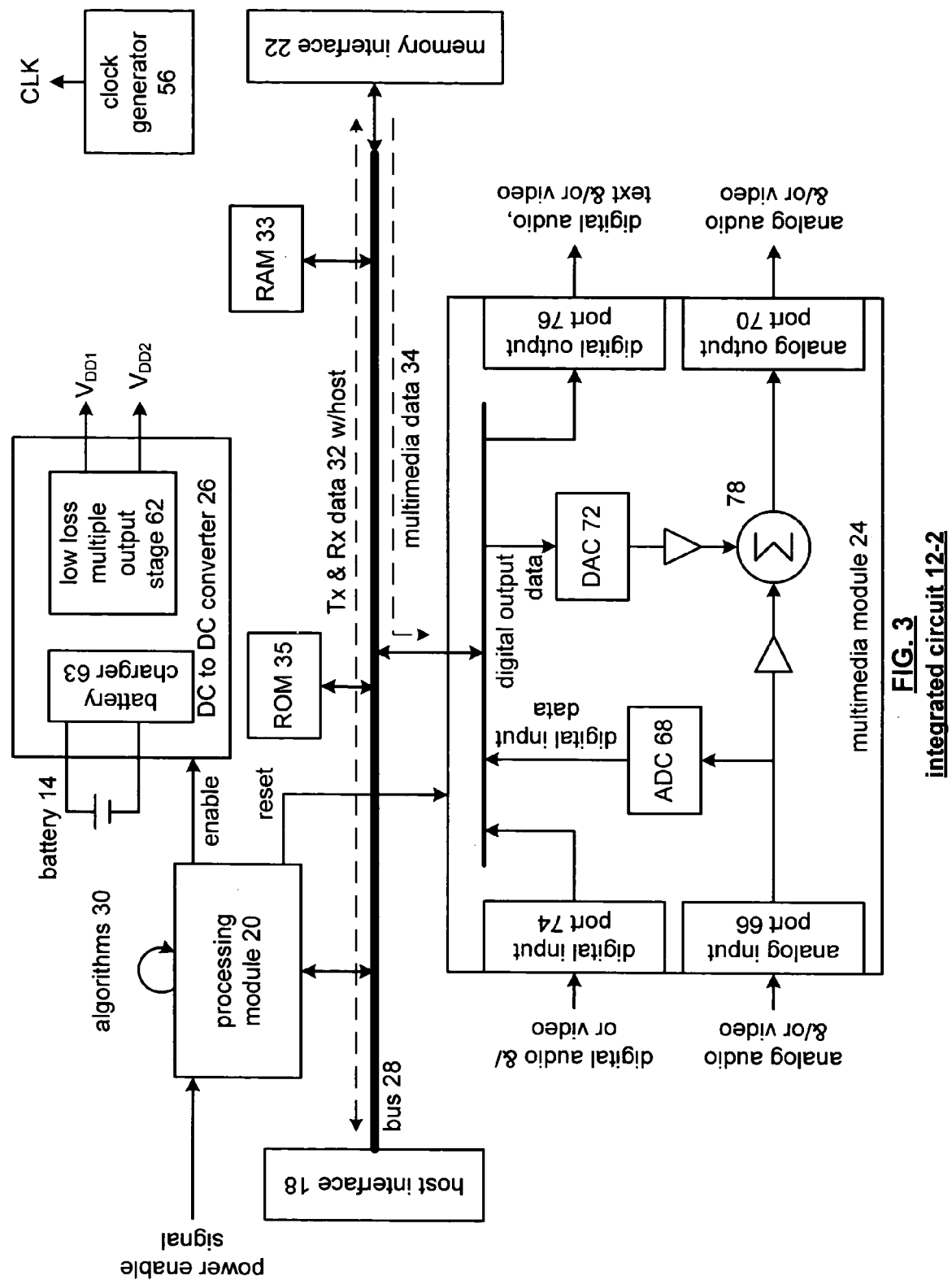
FIG. 3 is a schematic block diagram of an integrated circuit for use in a multifunction handheld device in accordance with the present invention.

FIG. 3 is a schematic block diagram of an integrated circuit 12-2 that may be used in a multi-function handheld device. The integrated circuit 12-2 includes the host interface 18, the processing module 20, the DC-to-DC converter 26, memory 60, the clock generator 56, the memory interface 22, the bus 28 and the multimedia module 24. The DC-to-DC converter 26 includes a first output section 62, and a second output section 64 to produce a first and second output voltage ($V_{DD1}$ and $V_{DD2}$), respectively. Typically, $V_{DD1}$ will be greater that $V_{DD2}$, where $V_{DD1}$ is used to source analog sections of the processing module 20, the host interface 18, the memory interface 22, and/or the multimedia module 22 and $V_{DD2}$ is used to source the digital sections of these modules. The DC-to-DC converter 26 may further include a battery charger 63 and a low loss multiple output stage 62. The battery charger 63 is operable to charge the battery 14 from power it receives via the physical coupling (e.g., via a USB cable) to the host device when the multi-function handheld device is physically coupled to the host device. The particular implementation of the battery charger 63 is dependent on the type of battery being used and such implementations are known in the art, thus no further discussion will be provided regarding the battery charger 63 except to further illustrate the concepts of the present invention.

The multimedia module 24 includes an analog input port 66, an analog to digital converter (ADC) 68, an analog output port 70, a digital to analog converter (DAC) 72, a digital input port 74, a digital output port 76, and an analog mixing module 78. The analog input port 66 is operably coupled to receive analog input signals from one or more sources including a microphone, an AM/FM tuner, a line in connection (e.g., headphone jack of a CD player), etc. The received analog signals are provided to the ADC 68, which produces digital input data therefrom. The digital input data may be in a pulse code modulated (PCM) format and stored as such, or it may be provided to the processing module 20 for further audio processing (e.g., compression, MP3 formatting, etc.) The digital input data, or the processed version thereof, is stored in memory 16 as instructed by the processing module 20.

The digital input port 74 is operably coupled to receive digital audio and/or video input signals from, for example, a digital camera, a camcorder, etc. The digital audio and/or video input signals may be stored in memory 16 under the control of the processing module 20. As one of average skill in the art will appreciate, the audio and/or video data (which was inputted as analog signals or digital signals) may be stored as raw data (i.e., the signals received are stored as is in designated memory locations) or it may be stored as processed data (i.e., compressed data, MPEG data, MP3 data, WMA data, etc.).

The DAC 72 receives multimedia data 34 as digital output data and converts it into analog video and/or audio output data that is provided to the mixing module 78. When the output of the DAC 72 is the only input to the mixing module 78, the mixing module 78 outputs the analog video and/or audio output data to the analog output port 70. The analog output port 70 may be coupled to one or more of the speaker, headphone jack, and a video display. The mixing module 78 may mix analog input signals received via the analog input port 66 with the output of DAC 72 to produce a mixed analog signal that is provided to the analog output port 70. Note that the buffers in series with the inputs of the mixing module 78 may have their gains adjusted and/or muted to enable selection of the signals at various gain settings provided to the mixing module 78 and subsequently outputted via the analog output port 70.

The digital output port 76 is operably coupled to output the digital output data (i.e., the multimedia data 34 in a digital format). The digital output port 76 may be coupled to a digital input of a video display device, another handheld device for direct file transfer, etc.

As one of average skill in the art will appreciate, the multimedia module 24 may include more or less components than the components shown in FIG. 3 or include multiple analog and/or digital input and/or output ports. For example, for a playback mode of digital audio files, the multimedia module 24 may only include the DAC 72 and the analog output port 70 that is coupled to the headphone jack and/or to the speaker. As another example, for recording voice samples (i.e., as a digital dictaphone), the multimedia module 24 may include the analog input port 66 coupled to the microphone and the ADC.

Figure 4:
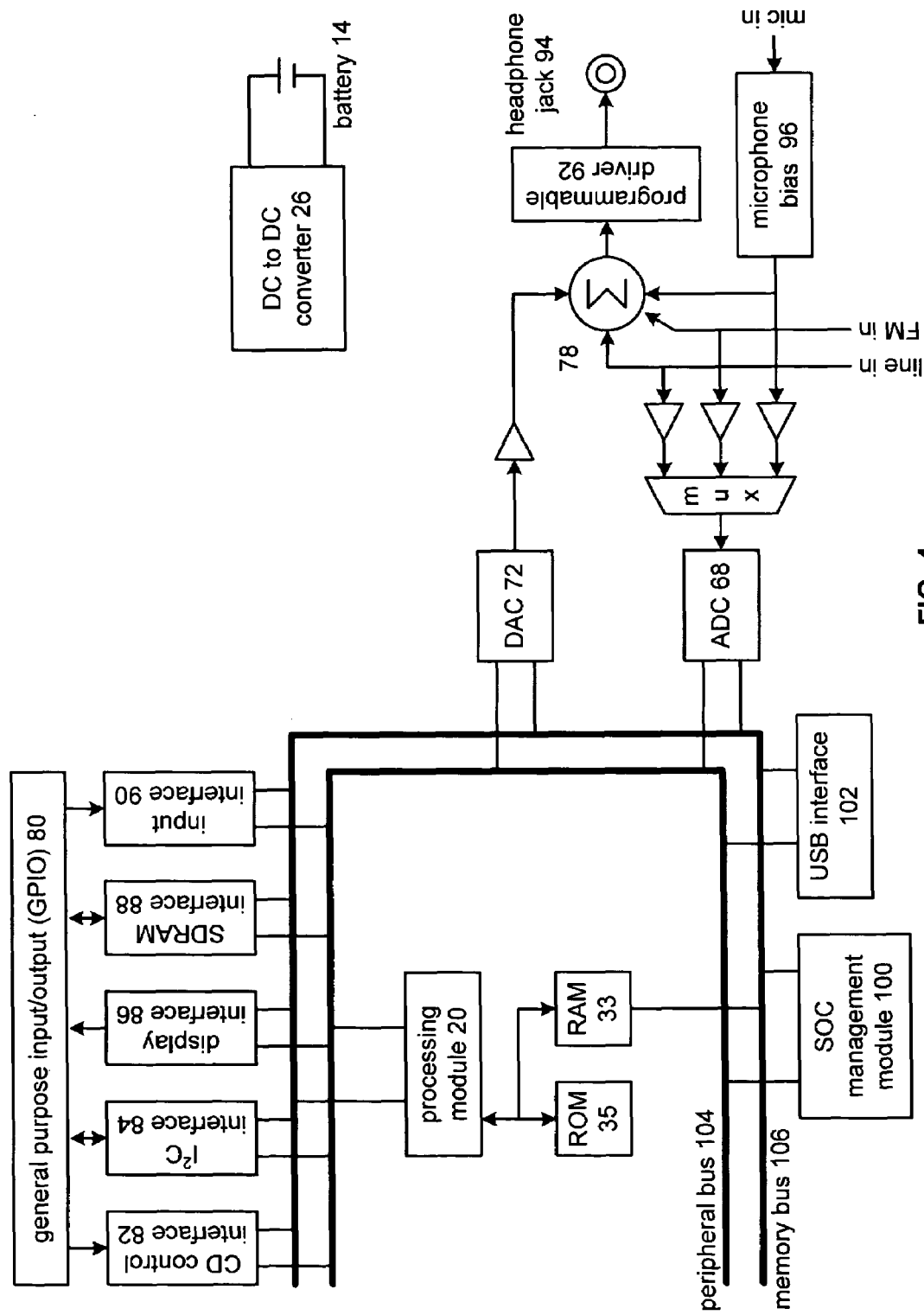
FIG. 4 is a schematic block diagram of another integrated circuit for use in a multifunction handheld device in accordance with the present invention.

FIG. 4 is a schematic block diagram of an integrated circuit 12-3 that may be incorporated in a multi-function handheld device 10 or 40. The integrated circuit 12-3 includes a general purpose input/output module 80, a CD control interface 82, an I²C interface module 84, a display interface module 86, a static and/or dynamic RAM interface 88, an input interface module 90, processing module 20, ROM 35, RAM 33, a peripheral bus 104, a memory bus 106, a system-on-a-chip (SOC) management module 100, a universal serial bus (USB) interface 102, a digital-to-analog converter 72, an analog-to-digital converter 68, a multiplexer, buffers, mixing module 78, DC to DC converter 26, a programmable driver 92, and a microphone bias module 96.

In operation, the integrated circuit 12-3 may facilitate the transceiving of data with a host device between system memory of a multi-function handheld device and a host device, may playback multimedia data, and/or may record multimedia data via input ports. When the integrated circuit 12-3 is transceiving with a host device, the USB interface 102 operably couples the integrated circuit 12-3 to a host device. In addition, the SDRAM interface 88 couples, either via the general purpose input/output module 80 or directly, to the system memory (e.g., memory IC 16) of the multi-function handheld device 10. In this configuration, data that is received from the host device is placed on the memory bus 106 by the USB interface 102. The SDRAM interface 88 retrieves the data from the memory bus 106 and forwards it for storage to the system memory under the control of the processing module 20 that is executing a file system storage algorithm. The data being stored may correspond to playback data, such as an MP3 file, a WMA file, a video file, a text file, and/or a combination thereof. Alternatively, or in addition to, the data being received from the host may correspond to programming instructions of an algorithm 30, which may be an MP3 decoder algorithm, a WMA decoder algorithm, a MPEG algorithm, a JPEG algorithm, et cetera.

For providing data from the handheld device 10 to the host device, the SDRAM interface 88 retrieves data from the system memory and places it on the memory bus 106 under the control of the processing module 20 as it executes a file system algorithm. The USB interface 102 retrieves the data from the memory bus 106 and forwards it to the host device in accordance with one of the versions of the USB standard.

Data may also be stored in the system memory that is received via the CD (compact disk) control interface 82, and/or the I²C interface 84 or other type of two or three wire data interface. Via these interfaces 82 and 84, data is received via the general purpose input/output module 80 and placed on the memory bus 106. The SDRAM interface 88 retrieves the data from the memory bus 106 and provides it to the system memory, which is done under the control of the processing module as it executes a data storage algorithm.

When the integrated circuit 12-3 is recording audio inputs received via the microphone input, the microphone bias circuit 96 provides the received audio signals to the mixing module 78 as well as to the multiplexer (mux) via a buffer. The microphone bias circuit 96 biases the audio input for optimal operations. The received audio input signals are is converted to digital audio signals via the analog-to-digital converter 68. The digital audio signals may then be stored in system memory (e.g., memory IC 16). Alternatively, the audio input signal may be provided to the summing module 78 and subsequently provided to headphone jack 94 via the programmable driver 92 as a component of a summed analog signal. The summing module 78 may sum, or pass any one of, the audio input signals may be mixed with other analog input signals, such as a line input, an FM radio input, and the analog output of the DAC 72, to produce the summed signal.

When the integrated circuit 12-3 is in a playback mode, digital multimedia data is retrieved from the system memory and provided to the digital-to-analog converter 72. The digital-to-analog converter 72 converts the digital multimedia signals, which may be audio data, video data and/or text data, into analog multimedia signals and provides the analog multimedia signals to mixing module 78. In the playback mode, the mixing module 78 will generally have the other inputs muted, such that its output corresponds directly to the analog multimedia signals provided by the digital-to-analog converter 72.

The programmable driver 92 increases the drive power of the analog multimedia signals (e.g., audio signals when the analog multimedia signals are provided to a headphone) and provides it to the headphone jack 94. As one of average skill in the art will appreciate, a fixed driver may replace the programmable driver 92 to drive the headphone jack 94.

To place the integrated circuit 12-3 into the various operational modes, commands are received via the general purpose input/output module 80 by the input interface 90. The input interface 90 receives the input stimulus corresponding to commands, interprets the input stimulus to generate the corresponding commands. The commands are then provided on the peripheral bus 104 and/or the memory bus 106 and processed by the processing module 20.

In addition to producing audio outputs during playback mode, the integrated circuit 12-3 may provide video outputs via the display interface 86, which will be described in greater detail with reference to FIG. 14. The display interface 86 drives the display, which may be an LCD display, LED display, plasma display and/or any other type of display. The data being displayed may correspond to the multimedia data retrieved from the system memory, and/or may correspond to the commands inputted via the input interface 90.

The system-on-a-chip (SOC) management module 100 processes interrupt controls, generates clock signals for the integrated circuit 12-3, performs bit manipulations, performs debugging operations, and executes a Reed-Solomon, or other type of encoding/decoding algorithm to encode and/or decode data.

The DC-to-DC converter 26 provides at least one supply voltage for the integrated circuit 12-3 and typically provides two supply voltages. For example, the DC-to-DC converter 26 may produce a 3.3 volts supply and a 1.8 volt supply.

FIG. 5 is a schematic block diagram of the handheld device of FIGS. 1 and/or 2 consuming power and managing the power consumption to provide efficient battery use in accordance with the present invention. As shown, battery 14 produces a battery voltage that, via a switch, is coupled to the DC-to-DC converter 26. The DC-to-DC converter produces a system voltage 112 which may correspond to $V_{DD\_1}$ or $V_{DD\_2}$ as shown in FIGS. 1–4. The multimedia module 24 is powered via the system voltage 112 and produces at least one output as shown in FIGS. 2 and 3. In this illustration, only the headphone jack 52 output of the multimedia module is shown. As shown, a pair of headphones 110 may be coupled to the headphone jack 52.

In operation, the processing module 20 executes an algorithm, as well be further described with reference to FIGS. 8–12, to monitor the battery usage by the handheld device and to ensure that, once the battery has been as close to fully consumed as possible, the handheld device is fully shutdown or at least partially shutdown in a safe manner such that when the battery is replaced, the handheld device will come up correctly. To facilitate the efficient battery use algorithm, the processing module 20 monitors the battery voltage, the system voltage 112 and/or the current and/or voltage of each output of the multimedia module 24, in this example the headphone jack 52. Typically, the monitoring of an output of the multimedia module 24 will be detecting whether an overload condition, produced by a short circuit, and/or faulty equipment coupled thereto, results in an excessive amount of power being drawn by that particular output. For example, if the headphones were faulty such that they cause a short within the headphone jack 52, an overload condition would result. When an overload condition results, the processing module 20 disables the output for a predetermined period of time (e.g., one second to ten seconds). When the predetermined period of time expires, the processing module 20 enables the output again and resumes monitoring for an overload condition. If the overload condition persists, the output is again disabled. The disabling and enabling of the output may be done by a switch mechanism and/or by placing an output driver at a high impedance state to disable, for this example, the headphone jack 52. If the overload condition persists after several retries, the processing module 20 may cease to continue the retry and generate an error message for display on the handheld device indicating that the particular output is experiencing an overload condition.

The processing module 20 also monitors the system voltage 112 for a system low voltage condition. A system low voltage condition results when, for example, the desired system voltage 112 is 3.3 volts and drops from the 3.3 voltage by a few percentile or more. The tolerance for the low system voltage condition may be relatively small (e.g., a few percent voltage drop) based on how well the output(s) of the DC-to-DC converter 26 are regulated. The less well regulated the output supply of the DC-to-DC converter is, the greater the tolerance needs to be for the low system voltage condition. The drop in the system voltage 112 may include or exclude load transients that cause ripple on the output of the DC-to-DC converter 26.

When a low system voltage condition arises, it is indicative that the amount of power being consumed by the handheld device is beyond the remaining power capacity of the battery 14 but is not causing dangerously low output voltages to be generated, which might result in an unsafe shutdown of the handheld device. In this instance, the processing module may disable one or more of the outputs of the handheld device, store the current settings of operation of the handheld device (e.g., volume setting, which particular song is being played from an MP3 storage file, bass settings, treble settings, et cetera). Once these settings have been stored, the handheld device is shutdown such that when the battery is replaced and the handheld device is reactivated, the operation continues where it left off. Alternatively, the processing module may shutdown only a portion of the handheld device. For example, the processing module for the low system voltage condition may shutdown the headphone jack which is a primary consumer of power for the handheld device but still allow for data file transfers and/or other low power consuming activities.

The processing module 20 also monitors the battery voltage. Typically, if the battery voltage drops below a particular threshold, in light of the monitoring of the system voltage 112 and the overload condition of one or more outputs, it is indicative that the battery is not making adequate contact with the power terminals of the handheld device thus appearing as no battery is present. When this condition is detected, the processing module stores essential settings corresponding to the execution of a functional algorithm being performed and shuts down the device. In this manner, the algorithm is terminated in a predictable manner, as opposed to crashing the algorithm, thus, when the device is restarted, the algorithm can be predictably be restarted.

FIGS. 6 and 7 illustrate graphs regarding power consumption of a battery. As shown in FIG. 6, battery consumption is plotted versus battery voltage. As the battery consumption approaches 100%, the battery voltage drops. The goal of the processing module 20 of FIG. 5 is to take the battery consumption as close to 100% as possible without damaging the software stored within the handheld device, which may occur if the handheld device loses power and does not shutdown in a safe manner. As such, by monitoring multiple points within the handheld device, the device may be shutdown in a safe manner while taking the battery consumption as close to 100% as possible.

FIG. 7 is a graph that plots voltage versus power consumption for CMOS integrated circuits. As shown, as the supply voltage increases the power consumption of an IC increases nonlinearly, which increases consumption of the battery (i.e., reduces battery life). Thus, the processing module monitors the battery voltage as the battery consumption is increased and, based on the power consumption of an IC versus supply voltage curve, determines how much power of the battery is left to power the handheld device. Based on the known amount of power available in the battery versus how much power is consumed by each of the portions of the handheld device, including the outputs, the processing module may determine whether the entire handheld device needs to be shutdown or only a portion thereof when a low system voltage condition is detected.

Figure 8:
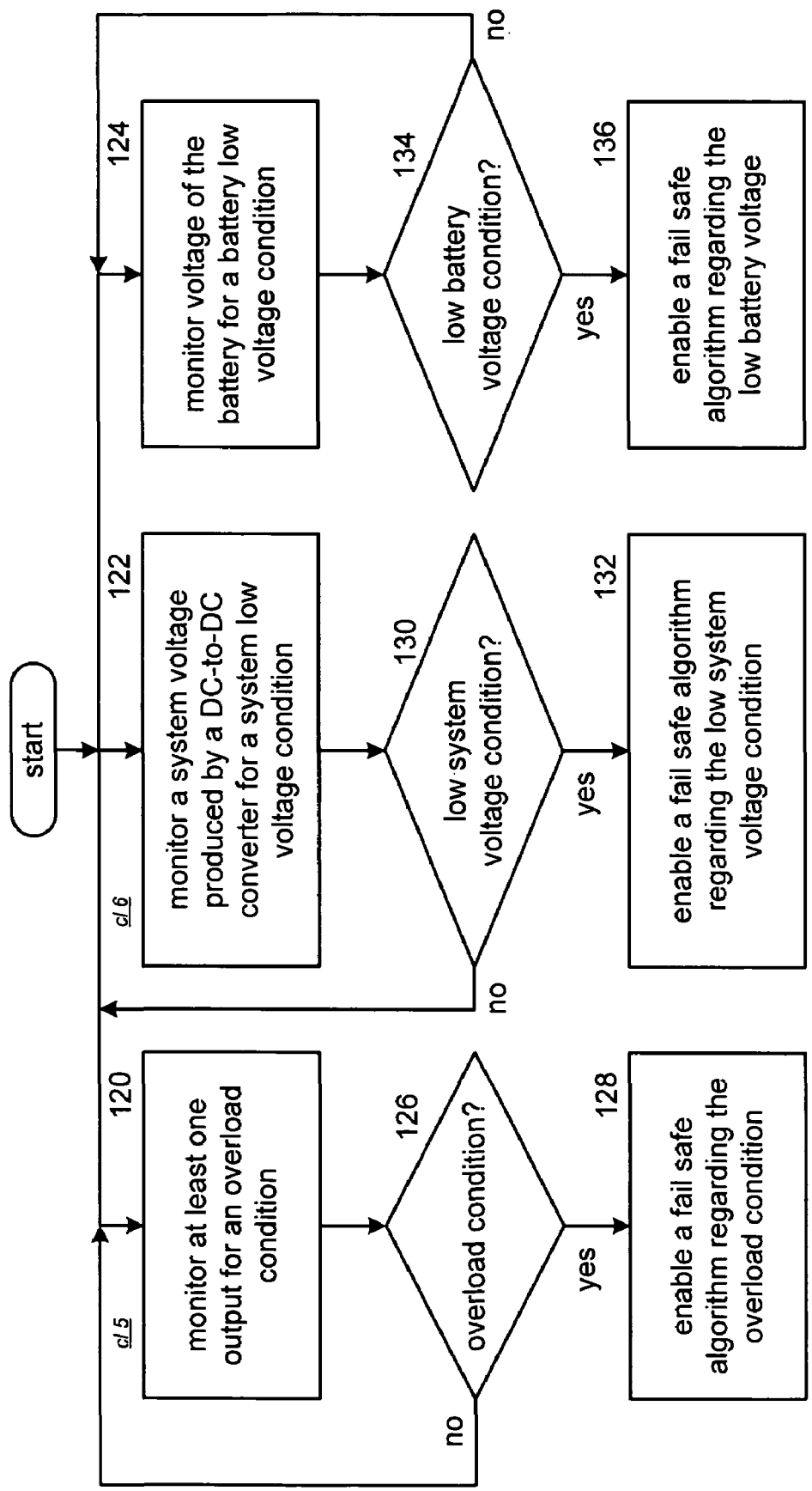
FIG. 8 is a logic diagram of a method for efficient battery use by a handheld device in accordance with the present invention.

FIG. 8 is a logic diagram of a method for efficient battery use by a handheld device. As shown, the process begins at Step 120, 122 and 124. As one of average skill in the art will appreciate, the efficient battery use by a handheld device may include one or more of the processing Steps 120, 122 and 124 and their associated steps.

At Step 120, at least one output of the handheld device is monitored for an overload condition. The process then proceeds to Step 126 where a determination is made as to whether an overload condition occurs. If not, the process loops back to the beginning of Step 120. Note that an overload condition may be detected by determining the output current provided to the particular output and when the output current exceeds a threshold indicating the overload condition.

If, however, an overload condition occurs, the process proceeds to Step 128 where a fail-safe algorithm regarding the overload condition is enabled. Such a fail-safe algorithm may be implemented as shown in FIG. 9.

At Step 138 of FIG. 9, the overload condition fail-safe algorithm begins by disabling the at least one output for a predetermined period of time (e.g., at least one second). The process then proceeds to Step 140 where after the expiration of the predetermined period of time, the at least one output is enabled. The process then proceeds to Step 142 where the at least one output is monitored again for an overload condition. If an overload condition persists, the processing module may generate an error message indicating the overload condition.

Returning to the logic diagram of FIG. 8, at Step 122 a processing module monitors a system voltage produced by the DC-to-DC converter for a system low voltage condition. The process then proceeds to Step 130 where determination is made as to whether the low system voltage condition exists. If not, the process reverts to Step 122. Note that the system low voltage condition may be determined by determining loading on one or more outputs of the DC-to-DC converter, determining the available power duration based on the loading and on the battery voltage, and, when the available power duration is less than the power available threshold, indicating the low system voltage condition. This was illustrated and discussed with reference to FIGS. 6 and 7.

If a low system voltage condition exists, the process proceeds to Step 132. At Step 132 the processing module enables a fail-safe algorithm regarding the low system voltage condition. The fail-safe algorithm for the low system voltage condition may be implemented as shown in FIG. 10 and/or FIG. 11.

In FIG. 10, the fail-safe algorithm begins at Step 144 where at least one output of the handheld device is disabled. The process then proceeds to Step 146 where the current settings correspond to execution of at least one functional algorithm is stored. The functional algorithm may be playing of an MP3 file, recording an MP3 file, data transfer et cetera. Thus, the particular settings of the current execution of this algorithm are stored such that the algorithm may be shutdown in a safe manner without corruption. The process then proceeds to Step 148 where the handheld device is shutdown.

FIG. 11 illustrates an alternate fail-safe algorithm for the low system voltage condition. The processing begins at Step 150 where a portion of the handheld device is disabled. The process then proceeds to Step 152 where current settings corresponding to the execution of at least one functional algorithm related to the particular portion that has been disabled, are stored. The process then proceeds to Step 154 where the operation of the handheld device continues in a limited, low power consumption mode.

Returning to the logic diagram of FIG. 8, at Step 124, the processing module monitors the voltage of the battery for a battery low voltage condition. The process then proceeds to Step 134 where a determination is made as to whether a low battery voltage condition exists. If not, the process loops back to Step 124. If, however, a low battery voltage condition exists, the process proceeds to Step 136 where a fail-safe algorithm regarding the low battery voltage is enabled.

FIG. 12 illustrates an example of a fail-safe algorithm for a low battery voltage condition. The process begins at Step 156 where essential current settings correspond to execution of at least one algorithm are stored. The process then proceeds to Step 158 where the handheld device is shutdown.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for efficient battery use by a handheld device. By monitoring multiple points within the handheld device, the battery life may be extended by utilizing the battery as close to 100% of its capabilities as possible. As one of average skill in the art will appreciate, other embodiments may be derived from the teaching of the present invention without deviating from the scope of the claims.

What is claimed is:

1. An integrated circuit for use by a multifunction handheld device, the integrated circuit comprises:
a processing module;
a memory, operably coupled to the processing module, for storing a plurality of digitally formatted files, and that stores operational instructions that cause the processing module to:
receive a first digitally formatted file of the plurality of digitally formatted files from a host device when coupled to the host device via a host interface and store the first digitally formatted file in the memory, wherein the handheld device is powered by the host device when coupled to the host device via the host interface;
generate a second digitally formatted file of the plurality of digitally formatted files by digitally recording a voice sample and store the second digitally formatted file in the memory;
playback a selected one of the plurality of digitally formatted files, the playback including the generation of an audio output;
monitoring for a low voltage condition produced by a low battery voltage;
when the low voltage condition is detected, enabling a first fail safe algorithm to:
disable the audio output;
store settings corresponding to the selected one of the plurality of digitally formatted audio files; and
shutdown the multifunction handheld device;
wherein, when the handheld device is reactivated, the memory further stores operationally instructions that enable the playback of the selected one of the plurality of digitally formatted files to resume where the playback left off.

2. The integrated circuit of claim 1 wherein the host interface includes a universal serial bus (USE) encoder and USE decoder.

3. The integrated circuit of claim 1 wherein the plurality of digitally formatted files includes at least one compressed digital audio file.

4. The integrated circuit of claim 1 wherein the plurality of digitally formatted files includes at least one compressed digital video file, and the memory further stores operationally instructions that cause the processing module to:
drive a video display device for playing the digital video file.

5. The integrated circuit of claim 1, wherein the memory further stores operational instructions that cause the processing module to:
monitoring of the audio output for an overload condition;
when an overload condition is detected and when the low voltage condition is not detected, enabling a second fail safe algorithm to:
disable the audio output for a predetermined period of time;
after expiration of the predetermined period of time, enable the audio output; and
resume monitoring of the audio output for the overload condition.

6. An integrated circuit for use by a multifunction handheld device, the integrated circuit comprises:
a processing module;
a memory operably coupled to the processing module, for storing a plurality of digitally formatted files, and that stores operational instructions that cause the processing module to:
receive a first digitally formatted file of the plurality of digitally formatted files from a host device when coupled to the host device via a host interface and store the first digitally formatted file in the memory;
generate a second digitally formatted file of the plurality of digitally formatted files by digitally recording a voice sample and store the second digitally formatted file in the memory;
playback a selected one of the plurality of digitally formatted files, the playback including the generation of an audio output;
monitoring for a low voltage condition produced by a low battery voltage;
when the low voltage condition is detected, enabling a first fail safe algorithm to:
disable the audio output;
store an audio setting corresponding to the playback; and
shutdown the multifunction handheld device.

7. The integrated circuit of claim 6 wherein the audio setting includes a volume setting.

8. The integrated circuit of claim 6 wherein the audio setting includes a bass setting.

9. The integrated circuit of claim 6 wherein the audio setting includes a treble setting.

10. The integrated circuit of claim 6 wherein the playback of the selected one of the plurality of digitally formatted files includes playback of a particular song, and the audio setting includes the particular song.

11. The integrated circuit of claim 6 wherein the host interface includes a universal serial bus (USB) encoder and USE decoder and wherein the handheld device is powered by the host device when coupled to the host device via the host interface.

12. The integrated circuit of claim 6 wherein the plurality of digitally formatted files includes at least one compressed digital audio tile.

13. The integrated circuit of claim 6 wherein the plurality of digitally formatted files includes at least one compressed digital video file, and the memory further stores operationally instructions that cause the processing module to:
drive a video display device for playing the digital video file.

14. The integrated circuit of claim 6, wherein the memory further stores operational instructions that cause the processing module to:
monitor the audio output for an overload condition;
when an overload condition is detected and when the low voltage condition is not detected, enabling a second fail safe algorithm to:
disable the audio output for a predetermined period of time;
after expiration of the predetermined period of time, enable audio output; and
resume monitoring of the audio output for the overload condition.

15. A method for use in a multifunction handheld device, the method comprises;
- receiving a first plurality of digitally formatted files from a host device when coupled to the host device via a host interface;
- playing a selected one of the first plurality of digitally formatted files, the playing including generating an audio output;
- monitoring for a low voltage condition produced by a low battery voltage;
  - when the low voltage condition is detected, enabling a first fail safe algorithm to:
  - disable the audio output;
  - store an audio setting corresponding to the playing of the audio output; and
  - shutdown the multifunction handheld device.

16. The method of claim 15 further comprising:
generating a second plurality of digitally formatted files by digitally recording a voice sample.

17. The method of claim 15 wherein the audio setting includes a volume setting.

18. The method of claim 15 wherein the audio setting includes a bass setting.

19. The method of claim 18 wherein the audio setting includes a treble setting.

20. The method of claim 15 wherein playing the selected one of the plurality of digitally formatted files includes playing a particular song, and the audio setting includes the particular song played.

21. The method of claim 15 wherein further comprising the step of:
powering the multifunction handheld device by the host device when coupled to the host device via the host interface.

22. The method of claim 15 wherein the plurality of digitally formatted files includes at least one compressed digital audio file.

23. The method of claim 15 wherein the plurality of digitally formatted files includes at least one compressed digital video file, and the method further comprises:
driving a video display device for playing the digital video file.

24. The method of claim 15, further comprising:
monitoring of the audio output for an overload condition;
when an overload condition is detected and when the low voltage condition is not detected, enabling a second fail safe algorithm to:
disable the audio output for a predetermined period of time;
after expiration of the predetermined period of time, enable the audio output; and
resume monitoring of the audio output for the overload condition.

25. An method for use in a multifunction handheld device, the method comprising:
- receiving a first plurality off digitally formatted files from a host device when coupled to the host device via a host interface;
- powering the multifunction handheld device by the host device when coupled to the host device via the host interface;
- playing a selected one of the plurality of digitally formatted files, the playing including the generation of an audio output;
- monitoring for a low voltage condition produced by a low battery voltage;
- when the low voltage condition is detected, enabling a first fail safe algorithm to:
  - disable the audio output;
  - store settings corresponding to the selected one of the plurality of digitally formatted audio files; and
  - shutdown the multifunction handheld device.

26. The method of claim 25 wherein, when the battery is replaced and the handheld device is reactivated, the playback of the selected one of the plurality of digitally formatted files resumes where the playback left off.

27. The method of claim 25 further comprising:
generating a second plurality of digitally formatted files by digitally recording a voice sample.

28. The method of claim 25 wherein the plurality of digitally formatted files includes at least one compressed digital audio file.

29. The method of claim 25 wherein the plurality of digitally formatted files includes at least one compressed digital video file, and the method further comprises:
driving a video display device for playing the digital video file.

30. The method of claim 25, further comprises:
monitoring of the audio output for an overload condition;
when an overload condition is detected and when the low voltage condition is not detected, enabling a second fail safe algorithm to:
disable the audio output for a predetermined period of time;
after expiration of the predetermined period of time, enable the audio output; and
resume monitoring of the audio output for the overload condition.

31. The method of claim 25 wherein playing the selected one of the plurality of digitally formatted files includes playing a particular song, and the settings corresponding to the selected one of the plurality of digitally formatted audio files includes the particular song played.

* * * * *

UNITED STATES PATENT AND TRADEMARK OFFICE
CERTIFICATE OF CORRECTION

PATENT NO. : 7,197,412 B2 Page 1 of 1
APPLICATION NO. : 11/407821
DATED : March 27, 2007
INVENTOR(S) : Marcus May et al.

It is certified that error appears in the above-identified patent and that said Letters Patent is hereby corrected as shown below:

Column 13, line 45, in Claim 2: replace "(USE)" with --(USB)--.

Column 13, line 46, in Claim 2: replace "USE" with --USB--.

Column 14, line 42, in Claim 11: replace "USE" with --USB--.

Column 14, line 47, in Claim 12: replace "tile" with --file--.

Column 15, line 2, in Claim 15: replace "comprises;" with --comprises:--.

Column 16, line 3, in Claim 25: replace "off" with --of--.

Signed and Sealed this

Twenty-fourth Day of February, 2009

JOHN DOLL
*Acting Director of the United States Patent and Trademark Office*